US008024735B2

(12) United States Patent
Rudd et al.

(10) Patent No.: US 8,024,735 B2
(45) Date of Patent: Sep. 20, 2011

(54) METHOD AND APPARATUS FOR ENSURING FAIRNESS AND FORWARD PROGRESS WHEN EXECUTING MULTIPLE THREADS OF EXECUTION

(75) Inventors: Kevin W. Rudd, Portland, OR (US); Udo Walterscheidt, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 554 days.

(21) Appl. No.: 10/173,334

(22) Filed: Jun. 14, 2002

(65) Prior Publication Data
US 2003/0233394 A1 Dec. 18, 2003

(51) Int. Cl.
*G06F 9/46* (2006.01)
(52) U.S. Cl. ........ 718/102; 718/103; 718/107; 718/108; 719/318; 712/220; 712/228
(58) Field of Classification Search .................. 718/103, 718/108, 102
See application file for complete search history.

(56) References Cited

U.S. PATENT DOCUMENTS

| | | | |
|---|---|---|---|
| 3,771,138 A | 11/1973 | Celtruda et al. | |
| 5,357,617 A | 10/1994 | Davis et al. | |
| 5,386,561 A | 1/1995 | Huynh et al. | |
| 5,404,469 A | 4/1995 | Chung et al. | |
| 5,430,850 A | 7/1995 | Papadopoulos et al. | |
| 5,499,349 A | 3/1996 | Nikhil et al. | |
| 5,524,263 A | 6/1996 | Griffth et al. | |
| 5,791,522 A | 8/1998 | Lee et al. | |
| 5,809,271 A | 9/1998 | Colwell et al. | |
| 5,809,522 A | 9/1998 | Novak et al. | |
| 5,892,959 A | 4/1999 | Fung | |
| 5,900,025 A | 5/1999 | Sollars | |
| 5,968,160 A | 10/1999 | Saito et al. | |
| 5,968,167 A | 10/1999 | Whittaker et al. | |
| 5,996,085 A | 11/1999 | Cheong et al. | |
| 5,999,932 A | 12/1999 | Paul | |
| 6,018,759 A * | 1/2000 | Doing et al. .................. 718/108 |
| 6,052,708 A | 4/2000 | Flynn et al. | |
| 6,052,709 A | 4/2000 | Paul | |
| 6,076,157 A * | 6/2000 | Borkenhagen et al. ....... 712/228 |
| 6,088,788 A | 7/2000 | Borkenhagen et al. | |

(Continued)

FOREIGN PATENT DOCUMENTS
EP 0346003 A2 12/1989
(Continued)

OTHER PUBLICATIONS

Robert A. Iannucci, Guang R. Gao, Robert H. Halstead, Jr., Burton Smith, "Multithreaded Computer Architecture: A Summary of the State of the Art", 1994, pp. 167-200.

(Continued)

*Primary Examiner* — H. Sough
*Assistant Examiner* — Kimberly Jordan
(74) *Attorney, Agent, or Firm* — Blakely, Sokoloff, Taylor & Zafman LLP

(57) ABSTRACT

A system and method for determine which threads to execute at a given time in a multi-threaded computer system. A thread prioritizer determines execution fairness between pairs of potentially executing threads. A switch enabler determines forward progress of each executing thread. The resulting indicators from the thread prioritizer and switch enabler may aid in the determination of whether or not to switch a particular potentially executing thread into execution resources.

40 Claims, 6 Drawing Sheets

U.S. PATENT DOCUMENTS

| | | | |
|---|---|---|---|
| 6,092,175 | A | 7/2000 | Levy et al. |
| 6,105,051 | A * | 8/2000 | Borkenhagen et al. ........ 718/103 |
| 6,105,127 | A | 8/2000 | Kimura et al. |
| 6,115,709 | A | 9/2000 | Gilmour et al. |
| 6,212,544 | B1 * | 4/2001 | Borkenhagen et al. ........ 718/103 |
| 6,233,599 | B1 | 5/2001 | Nation et al. |
| 6,256,775 | B1 | 7/2001 | Flynn |
| 6,389,449 | B1 | 5/2002 | Nemirovsky et al. |
| 6,430,593 | B1 | 8/2002 | Lindsley |
| 6,542,921 | B1 | 4/2003 | Sager |
| 6,567,839 | B1 * | 5/2003 | Borkenhagen et al. ........ 718/103 |
| 6,675,190 | B1 * | 1/2004 | Schabernack et al. ......... 718/102 |
| 6,697,935 | B1 * | 2/2004 | Borkenhagen et al. ........ 712/228 |
| 6,757,811 | B1 * | 6/2004 | Mukherjee .................... 712/220 |
| 6,757,897 | B1 * | 6/2004 | Shi et al. ....................... 718/102 |
| 6,792,525 | B2 * | 9/2004 | Mukherjee et al. ........... 712/244 |
| 6,928,647 | B2 | 8/2005 | Sager |
| 7,065,762 | B1 * | 6/2006 | Duda et al. .................... 718/102 |
| 2002/0087844 | A1 | 7/2002 | Walterscheidt et al. |
| 2003/0154235 | A1 | 8/2003 | Sager |
| 2003/0158885 | A1 | 8/2003 | Sager |

FOREIGN PATENT DOCUMENTS

| | | |
|---|---|---|
| EP | 0352935 A2 | 1/1990 |
| EP | 0725335 A1 | 8/1996 |
| EP | 0747816 A2 | 12/1996 |
| EP | 0 768 608 A2 | 4/1997 |
| EP | 0768608 A2 | 4/1997 |
| EP | 0827071 A2 | 3/1998 |
| EP | 0 856 797 A1 | 8/1998 |
| EP | 0768608 A3 | 8/1998 |
| EP | 0962856 A2 | 12/1999 |
| GB | 2 311 880 A | 10/1997 |
| WO | WO 99/21082 | 4/1999 |
| WO | WO 99/21088 A1 | 4/1999 |
| WO | WO 99/21089 A1 | 4/1999 |
| WO | WO 01/77820 A2 | 10/2001 |
| WO | WO 0177820 A3 | 10/2001 |

OTHER PUBLICATIONS

Richard J. Eickemeyer, Ross E. Johnson, Steven R. Kunkel, Beng-Hong Lim, Mark S. Squillante, C. Eric Wu, "Evaluation of Multithreaded Processors and Thread-Switch Policies", pp. 75-90.

Richard J. Eickemeyer, Ross E. Johnson, Steven R. Kunkel, Mark S. Squillante, Shiafun Liu, "Evaluation of Multithreaded Uniprocessors for Commercial Application Environments", Proceedings, The 23rd Annual International Symposium on Computer Architecture, May 22-24, 1996, Philadelphia, Pennsylvania, Sponsored by ACM SIGARCH, IEEE Computer Society, TCCA, 1996, pp. 203-212.

Dean M. Tullsen, Susan J. Eggers, Joel S. Emer, Henry M. Levy, Jack L. Lo, Rebecca L. Stamm, "Exploiting Choice: Instruction Fetch and Issue on an Implementable Simultaneous Multithreading Processor", Proceedings, The 23rd Annual International Symposium on Computer Architecture, May 22-24, 1996, Philadelphia, Pennsylvania, ACM SIGRACH, IEEE Computer Society, TCCA, pp. 191-202.

Manu Gulati, Nader Bagherzadeh, "Performance Study of a Multithreaded Superscalar Microprocessor", Proceedings, Second International Symposium on High-Performance Computer Architecture, Feb. 3-7, 1996, San Jose, California, Sponsored by The IEEE Computer Society Technical Committee on Computer Architecture, 1996, pp. 291-301.

Dennis Lee, Jean-Loup Baer, Brad Calder, Dirk Grunwald, "Instruction Cache Fetch Policies for Speculative Execution", pp. 1-11.

Peter Song, "Multithreading Comes of Age, Multithreaded Processors Can Boost Throughput on Servers, Media Processors", Microdesign Resources, Jul. 14, 1997, Microprocessor Report, pp. 13-18.

R. Guru Prasadh and Chuan-lin Wu, "A Benchmark Evaluation of a Multi-threaded Risc Processor Architecture", 1991 International Conference on Parallel Processing, pp. I-84-I-91.

Ruediger R. Asche, "Multithreading for Rookies" Microsoft.com/win32dev/base/threads.htm, Jul. 31, 1998, 15 pages.

Simon W. Moore, "Multithreaded Processor Design", The Kulwer International Series in Engineering andComputer Science, 1996, pp. 1-141.

Dongwook Kim, Joonwon Lee, Seungkyu Park, "A Partitioned On-Chip Virtual Cache for Fast Processors", Journal of Systems Architecture 43 (1997), pp. 519-531.

David C. Steere, Ashvin Goel, Joshua Gruenberg, Dylan McNamee, Calton Pu, Jonathan Walpole, "A Feedback-Driven Proportion Allocator for Real-Rate Scheduling", USENIX Association, Third Symposium on Operating Systems Design and Implementation (OSDI '99), pp. 145-157.

Intel P6 Family of Processors, Hardware Developer's Manual, Sep. 1998, Order No. 244001-001, 14 pages.

IBM Technical Disclosure Bulletin vol. 33, No. 7, Dec. 1990, Improved Dispatching in a Rendering Context Manager, pp. 131-134.

U.S. Appl. No. 09/534,191, entitled Method and Apparatus for Partitioning a Resource Between Multiple Threads Within a Multi-Threaded Processor, filed Mar. 24, 2000 by Chan Lee, Glenn Hinton, and Robert Krick.

Amamiya, Makoto, et al., "Datarol: A Parallel Machine Architecture for Fine-Grain Multithreading", IEEE, pp. 151-162 (1998).

Farrens, Matthew K., et al., "Strategies for Achieving Improved Processor Throughput", Proceedings of the 18th Annual International Symposium on Computer Architecture, Toronto, Canada, pp. 362-369 (May 27-30, 1991).

Jonsson, Jan, et al., "Non-Preemptive Scheduling of Real-Time Threads on Multi-Level-Context Architectures", submitted to the IEEE Workshop on Parallel and Distributed Systems (San Juan, Puerto Rico, Apr. 12-13, 1999), pp. i-ii and 1-26 (Dec. 18, 1998).

Mendelson, Avi, et al., "Design Alternatives of Multithreaded Architecture", International Journal of Parallel Programming, vol. 27, No. 3, pp. 161-193 (1999).

Ortiz, Daniel, et al., "A Preliminary Performance Study of Architectural Support for Multithreading", IEEE, pp. 227-233 (1997).

* cited by examiner

METHOD AND APPARATUS FOR ENSURING FAIRNESS AND FORWARD PROGRESS WHEN EXECUTING MULTIPLE THREADS OF EXECUTION

FIELD

The present disclosure relates generally to microprocessor systems, and more specifically to microprocessor systems capable of multi-threaded operation.

BACKGROUND

Many modern computer systems are able to execute more than one distinct software program, or "thread", without having to explicitly save the state for one thread and restore the state for another thread. For this reason they are referred to as "multi-threaded" computer systems. In one older approach, called sequential multi-threaded operation, the operating system or other control mechanism permits the several threads to share resources by permitting each thread that is a candidate for execution to operate in sequence on the processor. Changing between threads may be referred to as thread switching. In some of these older approaches, threads are switched when the currently executing thread executes for a certain period or reaches a point when it cannot proceed, such as waiting for a memory access or an I/O transfer to finish. The selection of the next thread to be switched in (permitted use of execution resources) may be made on the basis of strict priority. In other approaches, a round-robin approach may be used in thread switching.

Several modern microprocessors support what is known as simultaneous (or concurrent) multi-threaded operation. In these processors, several threads may execute simultaneously sharing resources in parallel rather than in sequence. However, in many cases there will still be more threads that need to be executed than there are hardware execution resources for thread execution. Therefore there will still be a need for thread switching, at least with respect to some resources, when using these processors.

One problem that may arise when thread switching is deadlock. Deadlock may be defined as the condition when a set of processes using shared resources or communicating with each other are permanently blocked.

A similar problem is livelock. Livelock may be defined as the condition when attempts by two or more processes to acquire a resource run indefinitely without any process succeeding.

Thus deadlock and livelock are two examples of potential problems that may arise when switching threads in a multi-threaded system. Improved algorithms for controlling switching threads and algorithms that address deadlock or livelock concerns may continue to be desirable for their ability to improve overall multi-threaded execution.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for permitting the execution of multiple threads in a microprocessor system. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of hardware within a microprocessor system. However, the invention may be practiced in other forms of processor such as a digital signal processor, a minicomputer, or a mainframe computer. The invention may also be practiced within the software of an operating system that may execute on any form of digital processor.

In one embodiment, the determination of which threads to switch and when to switch them is supported by a thread prioritizer and a switch enabler. In one embodiment, the thread prioritizer provides relative thread fairness indicators for each pair of threads that are enabled to execute in the processor. A separate fairness counter may be used to support each pair of threads, configured to count up when one thread is executing and to count down when the other thread is executing. A relative fairness indication may be derived from the value of the counter. Once the relative fairness is known for each pair of ready threads, an overall absolute fairness ranking may be determined. In one embodiment, the switch enabler may include a forward progress counter for each thread currently executing. In this embodiment, the value of the forward progress counter may be used to determine whether to permit a voluntary switching out of that particular thread.

Figure 1:
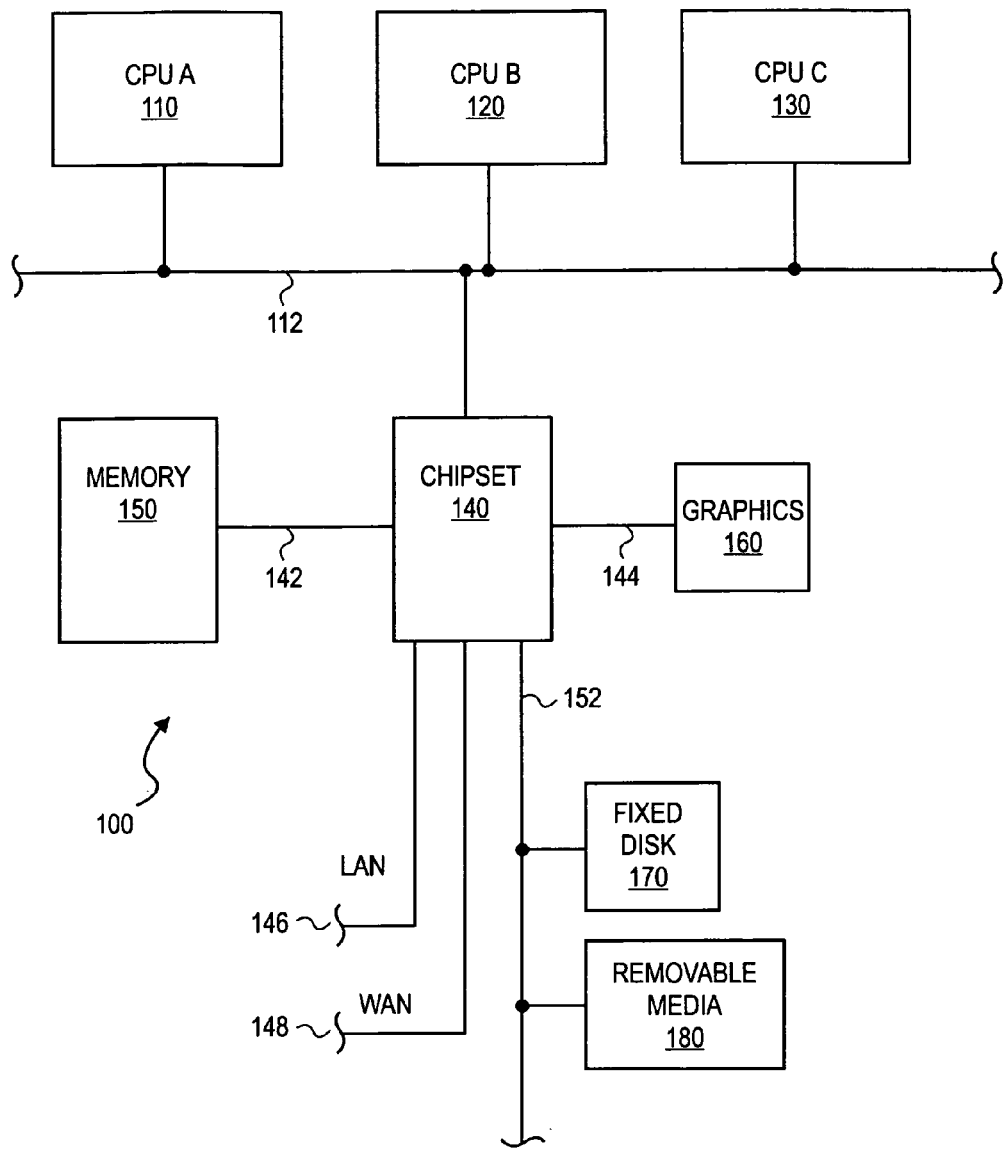
FIG. 1 is a schematic diagram of system hardware components, according to one embodiment.

Referring now to FIG. 1, a schematic diagram of system hardware components is shown, according to one embodiment. Several processors are shown, CPU A 110, CPU B 120, and CPU C 130. In other embodiments, there may only be one processor, or there may be a pair of processors, or more than three processors. The processors may be capable of only sequential multi-threaded operation, or they may be capable of simultaneous multi-threaded operation. In one embodiment, the processors may be compatible with the Intel® Itaniumm™ processor family.

The processors CPU A 110, CPU B 120, and CPU C 130 may be connected via a system bus 112 with each other and with chipset 140. The connection via the system bus 112 and the chipset 140 permits the processors to access system memory 150 and various input/output (I/O) devices, such as a controller for graphics 160 and various program storage devices. In other embodiments, the processors may be connected via some other form of interconnect such as point to point interconnections. Such program storage devices may include a system fixed disk 170 and a drive for removable media 180. In various embodiments, drive for removable media 180 may be magnetic tape, removable magnetic disks, diskettes, electro-optical disks, or optical disks such as CD-ROM or DVD-ROM. The I/O devices may be connected to the chipset 140 via a dedicated interface, such as advanced graphics port (AGP) 144, or via general-purpose interfaces such as peripheral component interconnect (PCI) bus 152, universal serial bus (USB) (not shown), or integrated drive electronics (IDE) bus (not shown). Additional I/O devices may include connectivity to a local area network (LAN) 146 or a wide area network (WAN) 148. In other embodiments, many other interfaces may be used.

In one embodiment, an operating system may be installed on system fixed disk 170 and the kernel of the operating system may be loaded into system memory 150. In other embodiments, the operating system may be loaded or execute over the LAN 146 or WAN 148. The operating system may control the thread switching in the processors CPU A 110, CPU B 120, and CPU C 130. In other embodiments, the hardware or firmware within the processors may control the thread switching, or the combination of the hardware or firmware within the processors together with an operating system may control the thread switching.

Figure 2:
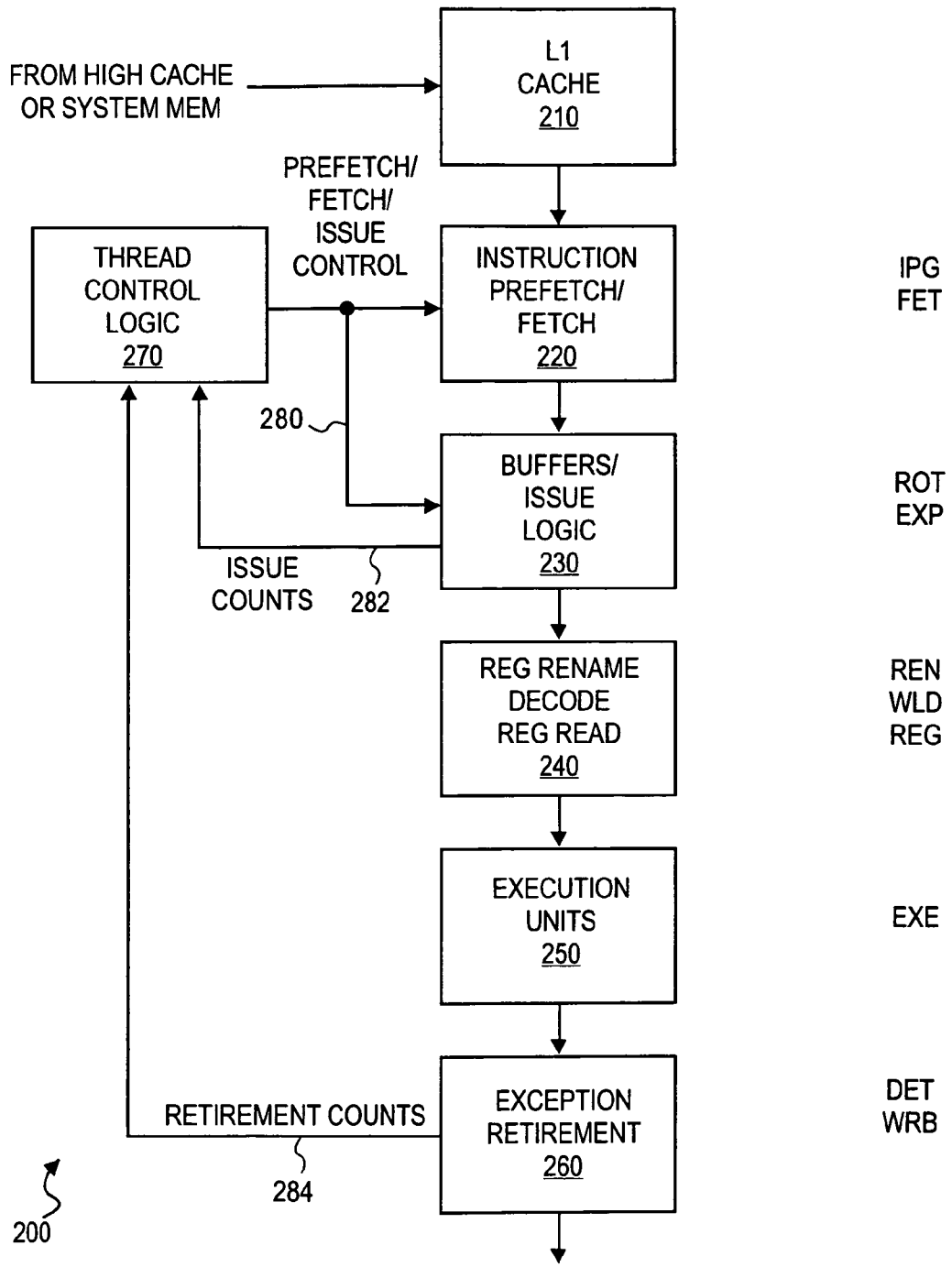
FIG. 2 is a schematic diagram of a portion of a processor, according to one embodiment.

Referring now to FIG. 2, a schematic diagram of a portion of a processor 200 is shown, according to one embodiment. FIG. 2 generally shows the pipeline of an embodiment of a processor. In other embodiments, there may be more or fewer stages in the pipeline, and functions shown within the stages may be allocated differently. The FIG. 2 shows a pipeline from a simultaneous multi-threaded processor, but in other embodiments a pipeline in a sequential multi-threaded processor may be used.

The instructions within level 1 (L1) cache 210 may include those ready for execution or those recently executed. An instruction prefetch/fetch 220 circuit attempts to load the instructions for the various threads being executed from L1 cache 210. If the requested instructions are not in L1 cache 210, circuitry seeks out and loads the instructions from higher levels of cache or even system memory (not shown). Instruction prefetch/fetch 220 is assisted by a thread control logic 270 that informs instruction prefetch/fetch 220 via prefetch/fetch/issue control signal 280 which threads should be switched in for execution, and therefore which particular instructions should be fetched. The quality of the prefetching may be enhanced by thread fairness and forward progress information.

After the instructions for the several threads are fetched, they are temporarily stored in buffers/issue logic 230. The buffers/issue logic 230, also receiving the issue control signal 280, also disperses the instructions to the following block, register rename/instruction decode/register read 240 circuitry. As part of the dispersement, buffers/issue logic may report one or more issue counts signals 282 back to the thread control logic 270. Immediately prior to their execution, the register environment needed for the instructions is setup by register rename/instruction decode/register read 240 circuitry. Then the instructions are executed by a group of several execution units 250. After execution, exceptions are handled and retirement is made by exception/retirement 260 circuitry. Exception/retirement circuitry 260 may also return one or more retirement counts signals 284 back to the thread control logic 270.

Figure 3:
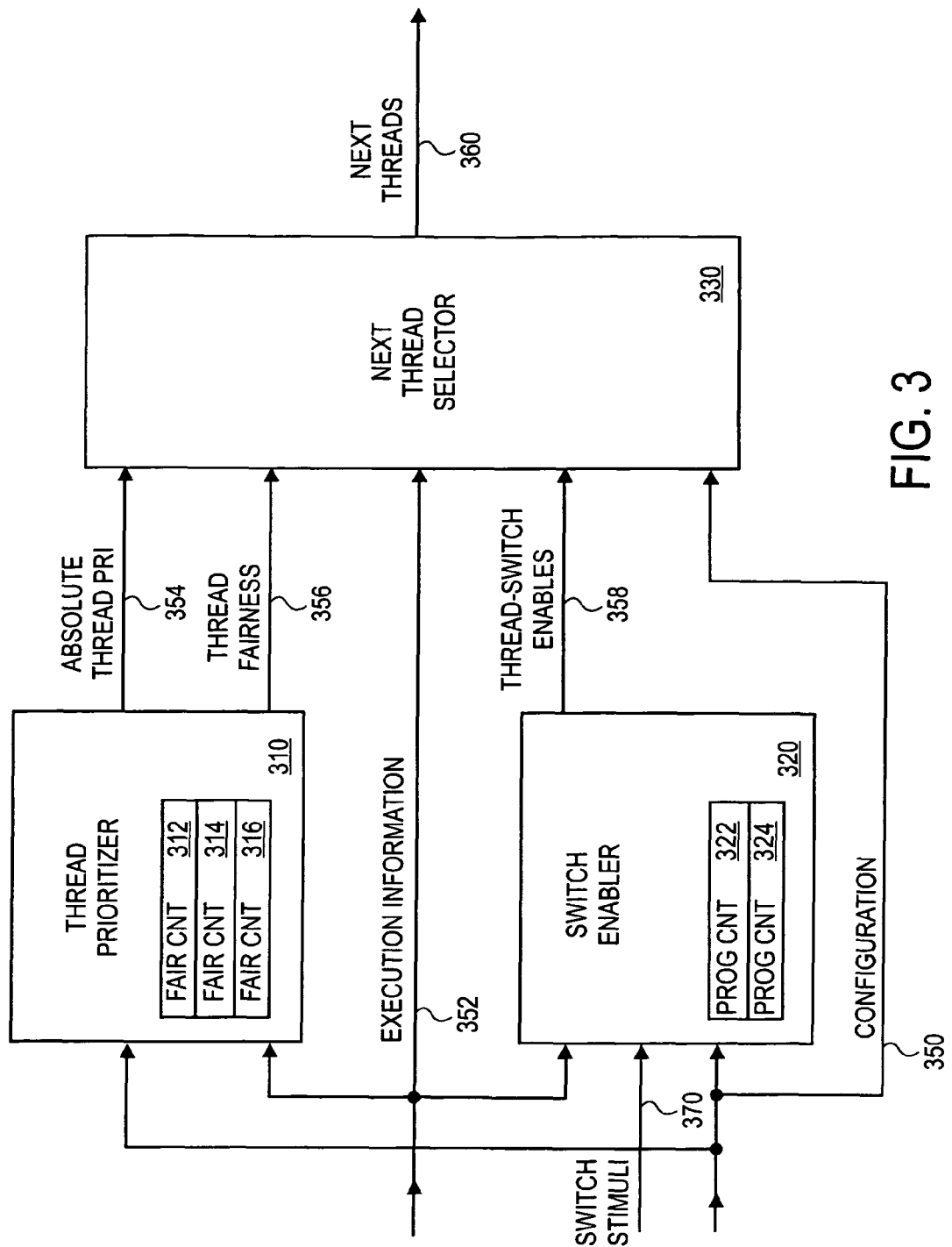
FIG. 3 is a schematic diagram of circuits to determine thread priorities, according to one embodiment of the present disclosure.

Referring now to FIG. 3, a schematic diagram of circuits to determine thread priorities is shown, according to one embodiment of the present disclosure. The thread prioritizer 310 may operate to generate two kinds of indicators that are presented to next thread selector 330. The first indicator may be an overall ranking of threads in order of most deserving to be running or switched in for execution, called an absolute thread priority 354 signal. In alternate embodiments, the thread priority signal may instead consist of the paired ordering of threads rather than a total order without loss of generality. The second indicator may present more details about the fairness of the recent execution history of each thread or pairs of threads, called a thread fairness 356 signal. Both indicators show information about the desired ordering of the threads.

In order to determine these two indicators, thread prioritizer 310 may utilize a number of fairness counters. In one embodiment, there is a fairness counter allocated for each pair of prospective threads. The number of prospective threads and other system information may be provided the thread prioritizer 310 by the configuration 350 signal. If there are N prospective threads, then there may be $N(N-1)/2$ fairness counters allocated. In one embodiment the fairness counters may be signed counters capable of being incremented or decremented. In other embodiments, a pair of unsigned counters may be used. In another embodiment, a single unsigned register or counter may be shared between two threads with the count corresponding to the degree of bias for the currently biased thread. In additional embodiments, the fairness counters may be constructed in software of an operating system. The fairness counter of a given pair of threads may be incremented or decremented by any of a number of execution "events." These events may include processor cycles, weighted processor cycles, instruction counts, weighted instruction counts, or any other repetitive event correlated to execution. In some embodiments, the weighting may vary in time, in response to operator type or in response to resource use. Complicated operations may be weighted more heavily than simpler ones. Execution information 352 signals may include any or all of the above events, and in addition other information such as the number of instruction completed or the number of cycles executed. In FIG. 3 there are shown three fairness counters, for a first/second (A/B) thread relative fairness (fairness counter 312), for a first/third (A/C) thread relative fairness (fairness counter 314), and for a second/third (B/C) thread relative fairness (fairness counter 316). For any other number of threads other than three, more or fewer similar fairness counters may be allocated. Details of the operation of the fairness counters are described below in connection with FIG. 4.

The FIG. 3 embodiment also includes a switch enabler 320 that enables the switching of threads based upon a determination of the forward progress of the currently executing threads. Switch enabler 320 takes into account the execution state of any currently executing threads, given in one embodiment by execution information signal 352, in conjunction with any switch stimuli 370. The individual switch stimulus of switch stimuli 370 may include, for example, interrupts, cache misses, and other threads coming ready to execute.

There may be many other examples of a switch stimulus. A given stimulus may be ignored during the current execution cycle if insufficient forward progress in an affected executing thread has been made.

Certain switch stimuli may not be postponed, such as responding to a non-maskable interrupt or other non-maskable stimuli. Such stimuli may be referred to as mandatory stimuli. Such stimuli may bypass or ignore any determination of forward progress within switch enabler 320. In contrast, certain switch stimuli may be postponed at the system's discretion. These maskable stimuli may be referred to as volative or voluntary stimuli, because thread switching in response to them may be considered a voluntary act. In order to exercise this discretion, switch enabler 320 may include a series of forward progress counters 322, 324.

In one embodiment, there is a forward progress counter allocated for each presently executing thread. Information about which threads are currently executing may be presented in the execution information 352 signal. Information about system capabilities such as number of threads that may be concurrently executed may be presented in the configuration 350 signal. If there may be M actually executing threads, then there may be M forward progress counters allocated. In one embodiment the forward progress counters may be unsigned counters capable of being incremented or reset. In other embodiments the forward progress counters may be software structures in an operating system. The forward progress counter of a given presently executing thread may be incremented by any of a number of execution "events" of that thread. As in the case of the fairness counters discussed above, these events may include processor cycles, weighted processor cycles, instruction counts, weighted instruction counts, or any other repetitive event correlated to execution. In the FIG. 3 embodiment, switch enabler 320 includes two forward progress counters, progress counter 322 and progress counter 324, corresponding to a capacity of executing two threads simultaneously. Details of the operation of the forward progress counters are described below in connection with FIGS. 5 and 6.

The absolute thread priority 354 signal and thread fairness 356 signal from thread prioritizer 310 and the thread switch enables 358 signals from the switch enabler 320 may be presented to a next thread selector 330. Next thread selector 330 may combine these signals, in conjunction with execution information 352 and configuration 350, to provide a circuit such as thread control logic 270 of FIG. 2 with a determination of exactly which threads should be switched in and switched out at a given time. In one embodiment, next thread selector 330 may select threads to be switched out based upon the fairness ordering given by absolute thread priority 354 signal when such bias is unfair as given by thread fairness 356 signal. In other embodiments, the thread switching may be made based upon a combination of factors such as unfairness, the current thread waiting for memory or I/O access, or the current thread simply having executed for too long a period of time even if that is determined to be fair. Acting upon such a selection may be delayed if the resulting stimulus is maskable and in response to the thread switch enables 358 signal. Such a determination may be expressed in a next threads 360 signal.

Figure 4:
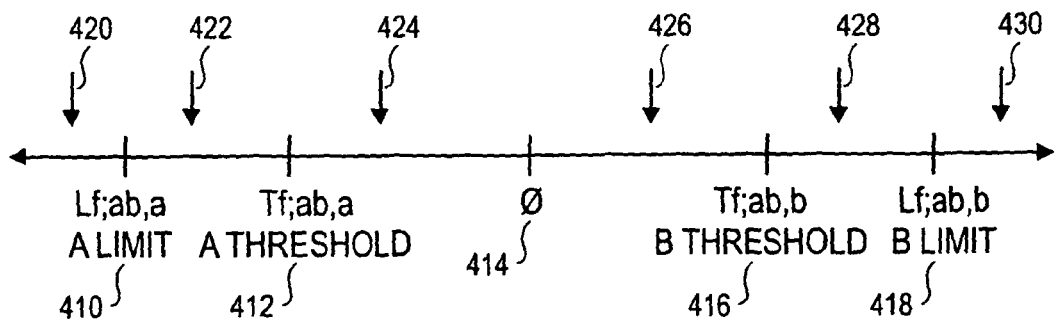
FIG. 4 is a diagram showing the interpretation of a fairness counter, according to one embodiment of the present disclosure.

Referring now to FIG. 4, a diagram showing the interpretation of a fairness counter is shown, according to one embodiment of the present disclosure. The number line 400 of FIG. 4 exhibits the contents of a fairness counter for a pair of threads, A and B, that are nominally ready to execute when allocated processor resources. A zero reference point 414 is shown, but any other number could be chosen as a reference.

When thread B is executing, the selected execution event for B causes the fairness counter to increment: when thread A is executing, the selected execution event for A causes the fairness counter to decrement. The number line shows an A threshold 412 and a B threshold 416. These thresholds may be selected to reflect determination of relative priorities of threads A and B. When the content of the fairness counter is at count 424, between the A threshold 412 and the zero reference point 414, thread A has had more execution events than has thread B, but not unfairly so. When in this range, it can be said that the relative execution history is "fairly biased towards A." Similarly, when the content of the fairness counter is at count 426, it can be said that the relative execution history is "fairly biased towards B."

When the content of the fairness counter is either below the A threshold 412 or above the B threshold 416, for example at count 422 or count 428, respectively, then it can be said that the relative execution history is now unfairly biased. At count 422 it can be said that the relative execution history is "unfairly biased towards A" whereas at count 428 it can be said that the relative execution history is "unfairly biased towards B". A determination of unfair bias towards one thread of a pair may be used to determine the absolute ordering or as a portion of switching stimuli 370 to switch to the other thread. The actual count, the content of the fairness counter and the threshold used, may additionally be used to indicate quantitatively the unfairness of the bias.

If the count was unrestricted, when one thread has a natural pause in execution, such as when waiting for data from an I/O device, the other thread could continue incrementing or decrementing the count of the fairness counter. (Note, however, that in some embodiments there may be execution events even when a thread is not running.) This may result in the paused thread being given too much access to future allocation of resources and may lead to temporal starvation for the previously running thread. (Here there may be defined two forms of starvation, a condition when a process is indefinitely denied access to a resource while other processes are granted access to the resource. Absolute starvation may be when the thread never gets to run, whereas temporal starvation may be when the thread is prevented from running for extended periods of time.) Therefore, there are two limits placed upon the fairness counter, an A limit 410 and a B limit 418. When execution events for thread A are continuing with no corresponding execution events for thread B, the count will eventually reach A limit 410. When this happens, the fairness counter stops decrementing in response to additional execution events for thread A. When count 420 is below the A limit 410, the fairness counter may not decrement until such time as offsetting thread B events increment the fairness counter above the A limit 410. Similarly the fairness counter may not increment above the B limit 418 until offsetting thread A events decrement the fairness counter below the B limit 418.

The behavior of the fairness counter may be summarized in Table I below. Note that in Table I certain inequalities may be expressed in terms of or rather than strict inequalities to ensure that a determination is made. In other embodiments, the location of the non-strict inequalities may be changed.

TABLE I

| Count Region | Condition | Switch Stimulus |
| --- | --- | --- |
| Count < A Limit | Unfair biased to A | Switch to B |
| A Limit ≦ Count < A Thres. | Unfair biased to A | Switch to B |
| A Thres. ≦ Count < Zero Pt. | Fairly biased to A | None |
| Zero Pt. ≦ Count < B Thres. | Fairly biased to B | None |

TABLE I-continued

| Count Region | Condition | Switch Stimulus |
| --- | --- | --- |
| B Thres. ≦ Count < B Limit | Unfair biased to B | Switch to A |
| B Limit ≦ Count | Unfair biased to B | Switch to A |

With more than a single pair of threads, as in the FIG. 3 embodiment, each fairness counter will determine the relative bias and the amount of such bias for a pair of threads. Knowing this information for all pairs of threads, circuitry such as thread prioritizer 310 of FIG. 3 may produce a strict ranking of bias of all the threads. This strict ranking may be included in the absolute thread priority 354 signal. Additionally the circuitry may be used to post fair bias or unfair bias indicators for the various threads, which may be included in the thread fairness 356 signal. In one embodiment, these fair bias or unfair bias indicators may be the actual count, coupled with relevant threshold information, within the fairness counter. In other embodiments, quantities derived from the actual counts, such as ratios, may be used. In other embodiments, they may be simplified to be the fair bias or unfair bias conditions shown in Table I.

Figure 5:
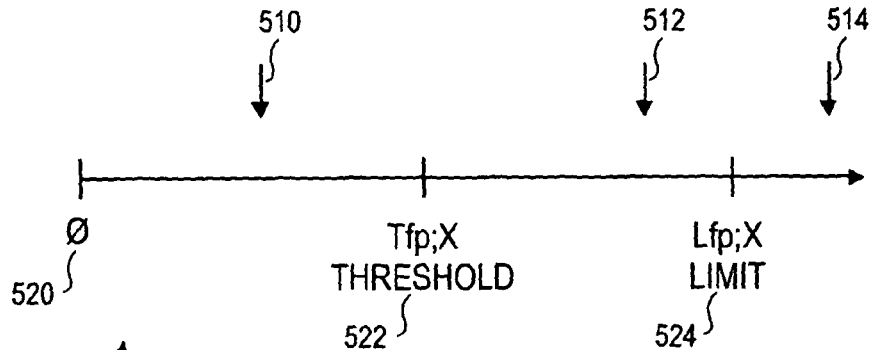
FIG. 5 is diagram showing the interpretation of a forward progress counter, according to one embodiment of the present disclosure.

Referring now to FIG. 5, a diagram of the interpretation of a forward progress counter is shown, according to one embodiment of the present disclosure. The number line 500 of FIG. 5 exhibits the contents of a forward progress counter for a currently executing thread. The forward progress counter may represent in turn numerous actual threads during operation. A zero reference point 520 is shown, but any other number could be chosen both as a reference, and for the purpose of serving as a reset point upon a new thread being switched in. The selected execution event for the executing thread causes the forward progress counter to increment with each event. The forward progress counter may have a threshold 522 for a given thread switch event beyond which it may be determined that the currently executing thread has made sufficient forward progress that it would be reasonable to permit a voluntary thread switch removing the currently executing thread from execution. In other embodiments, there may be more than one threshold representing different thread switch stimulus events, as discussed subsequently in connection with FIG. 6. In yet other embodiments a limit 524 may be placed upon the forward progress counter.

A switch enabler 320, including several forward progress counters 322, 324, may then qualify portions of switch stimuli 370 signals. The contents of a given forward progress counter may not affect a mandatory stimulus to remove a currently executing thread from execution. However, a voluntary stimulus to remove a currently executing thread from execution may be disabled until the count of the corresponding forward progress counter is greater than or equal to the threshold 522. In other embodiments, the voluntary stimulus may be disabled until the count of the corresponding forward progress counter is strictly greater than the threshold 522. When the count is at count 510, the voluntary stimulus may be disabled. When the count is at count 512, the voluntary stimulus may be enabled. In either case the qualified switch stimuli are then posted to the next thread selector 330 as thread-switch enables 358. The individual forward progress counters may post either the actual count, perhaps with relevant threshold information, to logic within switch enabler 320, or just the indication of exceeding the threshold. In other embodiments quantities derived from the count, such as ratios, may be used. In any case the forward progress counter posts an executing thread voluntary switch enabled indicator.

Figure 6:
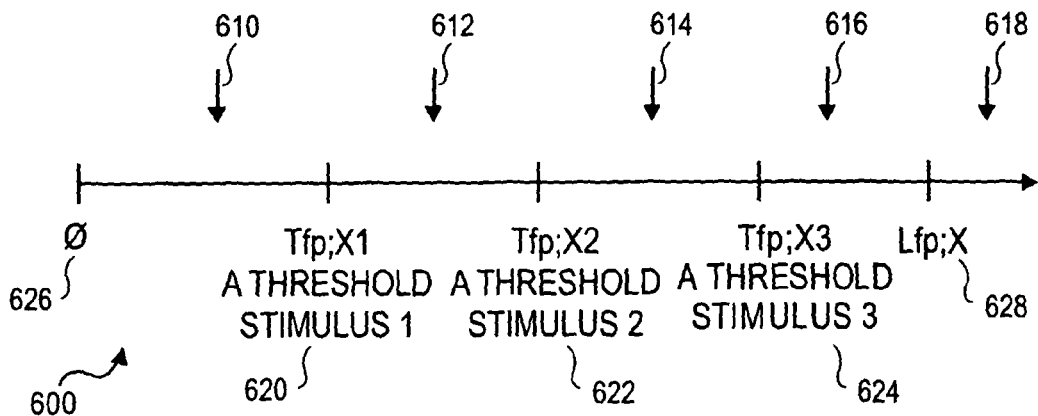
FIG. 6 is a diagram showing the interpretation of a forward progress counter, according to another embodiment of the present disclosure.

Referring now to FIG. 6, a diagram of the interpretation of a forward progress counter is shown, according to another embodiment of the present disclosure. There may be differing levels of significance that may be attributed to differing thread switch stimuli during processor operations. Therefore in this other embodiment a different forward progress threshold is established for each group or category of thread switch stimuli that may be encountered. In the FIG. 6 embodiment, for a given thread A, a type 1 switch stimulus has an A threshold for stimulus 1 620, a type 2 switch stimulus has an A threshold for stimulus 2 622, and a type 3 switch stimulus has an A threshold for stimulus 3 624. For example, a switch stimulus in response to an interrupt may be considered to be type 1 switch stimuli, a switch stimulus in response to a cache miss event may be considered to be a type 2 switch stimuli, and when another thread becomes ready to execute may be considered to be a type 3 switch stimuli. In this embodiment, when thread A is executing, when the forward progress count of the forward progress counter is at count 610 any voluntary switch stimulus for switching thread A from execution may be disabled. When the forward progress count is at count 612, a voluntary switch stimulus of type 1 becomes enabled for thread A, but switch stimuli of types 2 and 3 remain disabled. When the forward progress count is at count 614, a switch stimulus of type 1 or type 2 becomes enabled for thread A, but a switch stimuli of type 3 remains disabled. Finally, when the forward progress count is at count 616, a switch stimulus of either type 1, type 2, or type 3 becomes enabled for thread A. In other embodiments, there may be more or fewer than three types of thread switch stimuli represented, and the exemplary switch stimuli of each category may vary from the simple examples given above. In other embodiments a limit 628 may be placed upon the counter. The switch enabler may be configured to selectively ignore specific thread switch stimuli or classes of stimuli independent of their threshold values.

Figure 7:
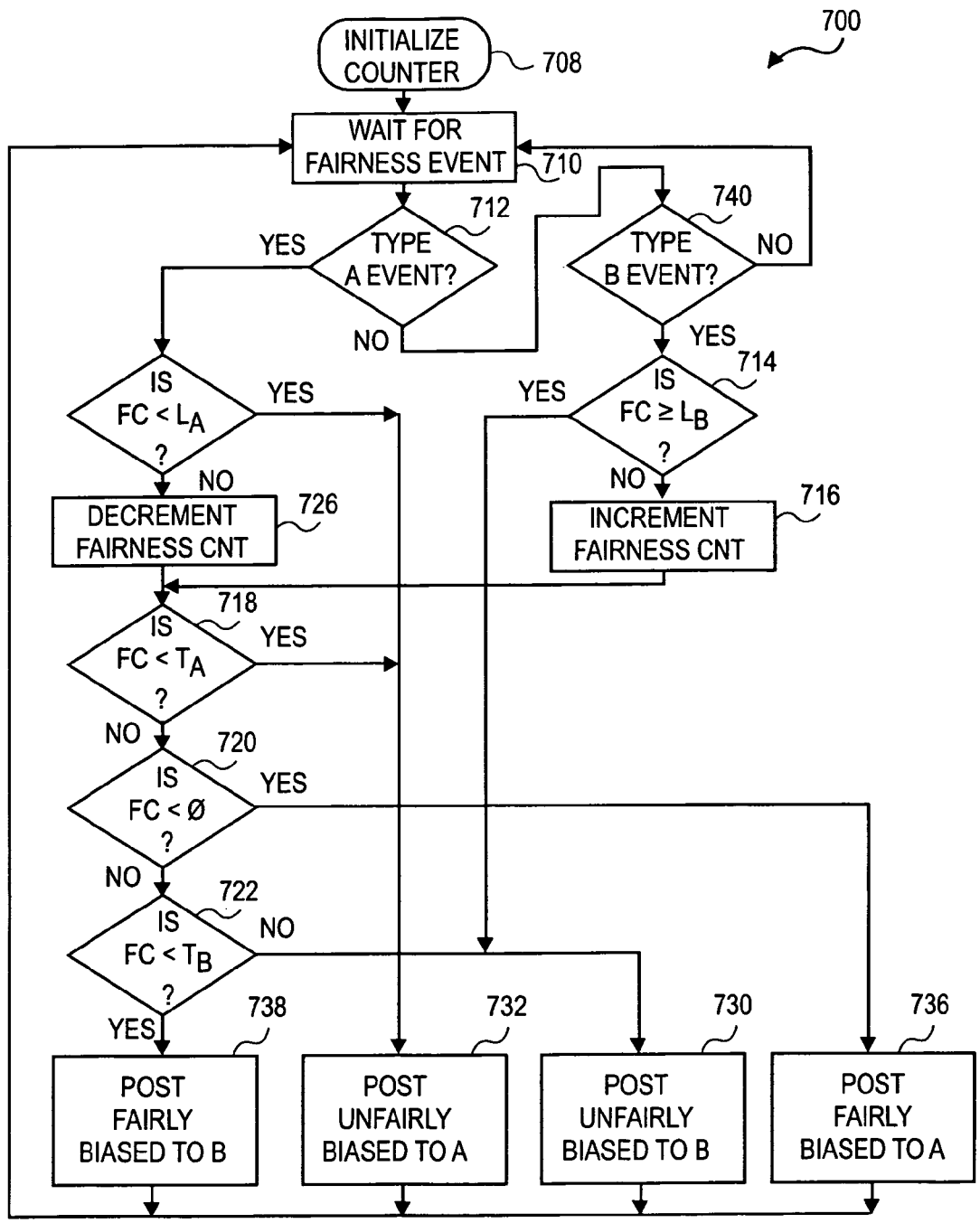
FIG. 7 is flow chart showing the determination of fairness between two threads, according to one embodiment of the present disclosure.

Referring now to FIG. 7, a flow chart of the determination of fairness between two threads is shown, according to one embodiment of the present disclosure. In the FIG. 7 embodiment, the fairness counter of FIG. 4 may be considered, but other embodiments may utilize the FIG. 7 method. Such other embodiments may be embodied in a processor hardware and firmware, or may be embodied in an operating system software. In the following discussion the expression "posted" may indicate that a static message is delivered on dedicated signal wires, or it may alternatively mean that a data message is delivered over a data path. In one embodiment, "posted" may be interpreted to mean posting a new signal only when the situation has changed, and will not mean posting the signal again if no change has transpired. In one embodiment, any posted signal may supercede any not-posted signal that occurs in the same time period so that a not-posted indication may not override a valid posting indication, causing a switch event to be missed or delayed.

The FIG. 7 process 700 begins with the initialization of the fairness counter in block 708. This initialization may include the loading of the threshold and limit values, and also the calculation and application of any initial bias. In block 710 the fairness counter waits for a fairness (or execution) event to occur. When an event occurs, in decision block 712 it is determined whether the event is a thread A event or not. If the event is a thread A event, then in decision block 724 it is determined if the fairness count (FC, content of the fairness counter) is less than the A limit. If so, then in block 732 an unfair bias to thread A indicator is posted. If not, then in block 726 the fairness counter is decremented, and the process moves on to decision block 718.

If the event is determined in decision block 712 to be not a thread A event, then the process enters decision block 740 where it is determined whether the event is a thread B event. If not, then the process re-enters block 710. But if so, then in decision block 714 it is determined whether the fairness count exceeds the B limit. If so, then in block 730 an unfair bias to thread B indicator is posted. If not, then in block 716 the fairness counter is incremented, and the process moves on to decision block 718.

In decision block 718 it is determined whether the fairness count is less than the A threshold. If so, then an unfair bias to thread A indicator is posted. If not, then the process continues to decision block 720. In decision block 720 it is determined whether the fairness count is less than the zero reference point. If so, then a fair bias to thread A indicator is posted at block 736. If not, then the process continues to decision block 722. In decision block 722, it is determined whether the fairness count is less than the B threshold. If so, then a fair bias to thread B indicator is posted at block 738. If not, an unfair bias to thread B indicator is posted at block 730.

Figure 8:
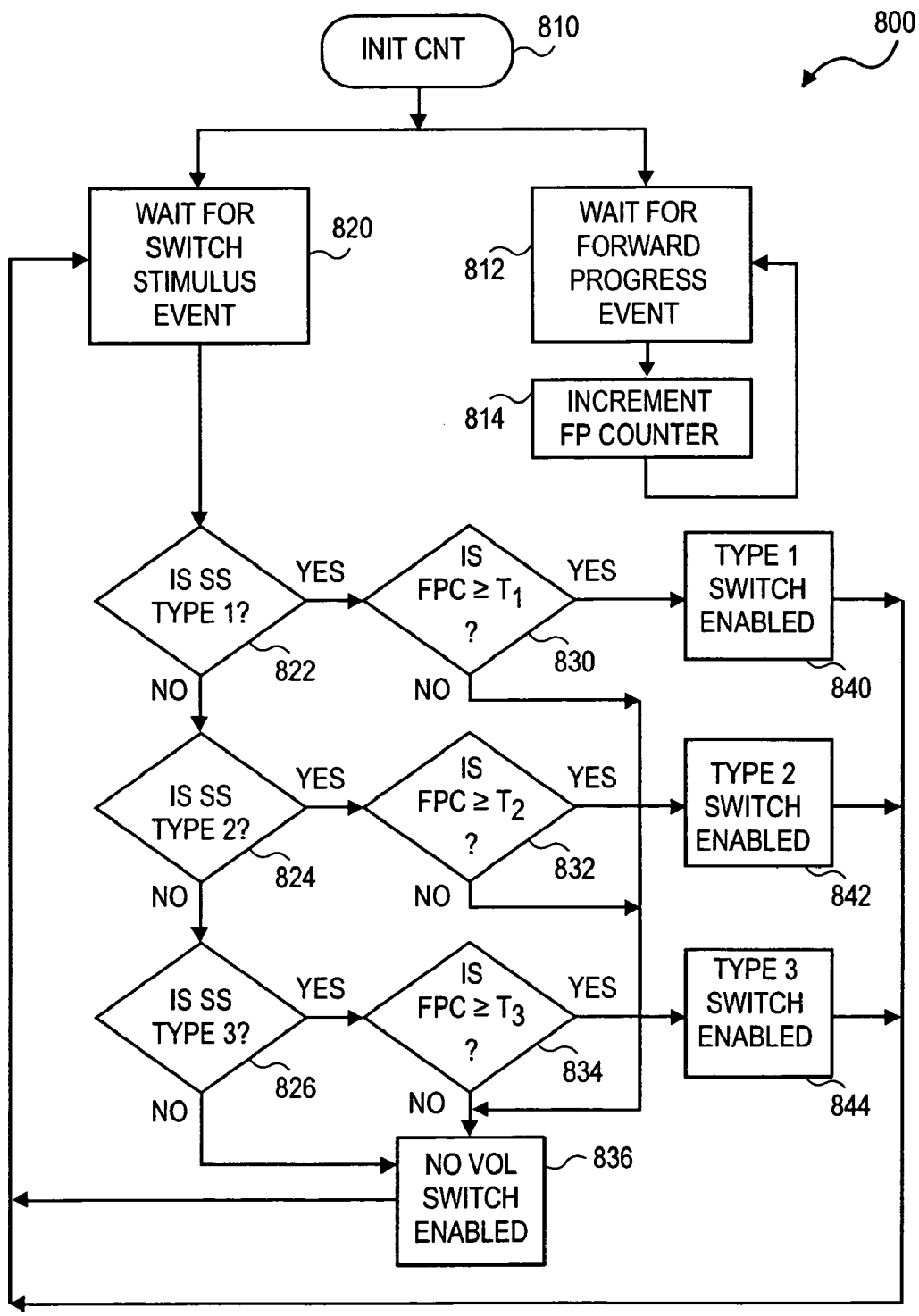
FIG. 8 is a flow chart showing the determination of forward progress of a executing thread, according to one embodiment of the present disclosure.

Referring now to FIG. 8, a flow chart of the determination of forward progress of a executing thread is shown, according to one embodiment of the present disclosure. In the FIG. 8 embodiment, the forward progress counter of FIG. 6 may be considered, but other embodiments may utilize the FIG. 8 method. Such other embodiments may be embodied in a processor hardware and firmware, or may be embodied in an operating system software. In the FIG. 8 embodiment, thread switch stimulus events are considered to be independent of forward progress events. In other embodiments, forward progress events may also be thread switch stimulus events, in which case additional decision blocks must be added to the process of FIG. 8.

When a thread begins execution, in block 810 the forward progress counter is initialized, which may include resetting the forward progress counter to zero, or some other bias point, and loading the thresholds to be used. Then in block 812 the process 800 waits for a forward progress event, which may be an execution event associated with the currently executing thread. When an event is detected, in block 814 the forward progress counter is incremented, and the process 800 returns to block 812.

At the same time the process 800 enters the block 812, it also enters block 820 wherein it waits for a thread switch stimulus event. When a thread switch stimulus event occurs, then in decision block 822 it is determined whether the thread switch stimulus event is of type 1. If so, then in block 830 it is determined whether the forward progress count is greater than or equal to the A threshold for stimulus type 1. If so, then a signal is sent conveying the information that a type 1 switch stimulus is enabled, in block 840. If not, then in block 836 a signal is sent conveying the information that no voluntary switch stimulus is enabled. In one embodiment, a signal is sent only if there has been a change in status from the time when the preceding signal was sent.

If, in decision block 822, it was determined that the thread switch stimulus event is not of type 1, then in decision block 824 it is determined whether the thread switch stimulus event is of type 2. If so, then in decision block 832 it is determined whether the forward progress count is greater than or equal to the A threshold for stimulus type 2. If so, then a signal is sent conveying the information that a type 2 switch stimulus is enabled, in block 842. If not, then in block 836 a signal is sent conveying the information that no voluntary switch stimulus is enabled.

If, in decision block 824, it was determined that the thread switch stimulus event is not of type 2, then in decision block 826 it is determined whether the thread switch stimulus event is of type 3. If so, then in decision block 834 it is determined whether the forward progress count is greater than or equal to the A threshold for stimulus type 3. If so, then a signal is sent conveying the information that a type 3 switch stimulus is enabled, in block 844. If not, then in block 836 a signal is sent conveying the information that no voluntary switch stimulus is enabled.

The individual bias indicators for each pair of threads posted in the FIG. 7 method may be combined to form the absolute thread priority 354 signal and thread fairness 356 signal from thread prioritizer 310. Similarly the individual type X switch stimulus enablement signals for each currently executing thread posted in the FIG. 8 method may be combined to form the thread switch enables 358 signals from the switch enabler 320. These signals may be presented to a next thread selector 330 that may combine these signals to provide another circuit, such as thread control logic 270 of FIG. 2, with a determination of exactly which threads should be switched in and switched out at a given time. In one embodiment, next thread selector 330 may select threads to be switched out based upon the fairness ordering given by absolute thread priority 354 signal when such bias is unfair as given by thread fairness 356 signal. Acting upon such a selection may be delayed if the resulting stimulus is maskable and in response to the thread switch enables 358 signal. Such a determination may be expressed in a next threads 360 signal.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:

logic circuitry to determine fairness of execution of a first thread relative to execution of a second thread based on a single value stored in a fairness counter, wherein the fairness counter is to be incremented in response to execution of one of the first thread or second thread and is to be decremented in response to execution of another one of the first thread or second thread, wherein the fairness counter is to be incremented or decremented in response to an execution event corresponding to the first thread or second thread, the event comprising: processor cycles, weighted processor cycles, or weighted instruction counts, logic circuitry to identify a next thread for execution based on the determined fairness and an execution information signal that indicates information about currently executing threads, wherein the logic circuitry to identify the next thread is to cause generation of a next thread signal to cause a processor to execute the next thread; and logic to determine forward progress of a plurality of executing threads based on values stored in respective forward progress counters and a switch stimulus type from a plurality of switch stimulus types, wherein a value of a forward progress counter is to indicate whether to permit a voluntary switching out of a corresponding thread, and wherein the first thread and the second thread are distinct.

2. The apparatus of claim 1, wherein the logic to determine fairness is to determine fairness of execution of the first thread relative to execution of a third thread; and wherein the logic to identify the next thread for execution is to identify the next thread for execution based on the determined fairness of execution of the first thread relative to execution of the second thread and based on the determined fairness of execution of the first thread relative to execution of the third thread.

3. The apparatus of claim 1, wherein the logic to identify the next thread is to identify the next thread based on an execution signal that is to indicate a number of threads which may be concurrently executed by the processor.

4. The apparatus of claim 1, wherein the logic to determine fairness is to modify content of the fairness counter in response to a first thread event and in response to a second thread event.

5. The apparatus of claim 1, wherein the logic to determine fairness is to determine an unfair bias to the first thread if content of the fairness counter exceeds a threshold.

6. The apparatus of claim 5, wherein the logic to determine fairness is to determine an unfair bias to the second thread if content of the fairness counter exceeds another threshold.

7. The apparatus of claim 1, wherein the logic to determine fairness is to limit modification of content of the fairness counter in response to a first thread event.

8. The apparatus of claim 7 wherein the logic to determine fairness is to limit modification of content of the fairness counter in response to a second thread event.

9. The apparatus of claim 1, comprising:
logic to switch execution to the next thread in response to the determined forward progress.

10. The apparatus of claim 9, wherein the logic to determine forward progress includes the forward progress counter.

11. The apparatus of claim 10, wherein the logic to determine forward progress is to modify content of the forward progress counter in response to an executing thread event.

12. The apparatus of claim 10, wherein the logic to switch execution to the next thread is to switch execution to the next thread in response to content of the forward progress counter exceeding a threshold.

13. The apparatus of claim 10, wherein the logic to switch execution to the next thread is to switch execution to the next thread in response to content of the forward progress counter exceeding one of a plurality of switch stimulus event thresholds.

14. The apparatus of claim 10, wherein the logic to determine forward progress is to reset content of the forward progress counter when thread execution is switched.

15. The apparatus of claim 1, wherein the logic circuitry to determine fairness of execution determines the fairness of execution of the first thread relative to execution of the second thread based on the value stored in the fairness counter and an absolute thread priority signal that indicates priorities of the first thread, the second thread, and at least a third thread.

16. The apparatus of claim 1, wherein the event further comprises an instruction count or any other repetitive event corresponding to execution.

17. A method comprising:
determining fairness of execution of a first thread relative to execution of a second thread based on a single value stored in a fairness counter, wherein the fairness counter is to be incremented in response to execution of one of the first thread or second thread and is to be decremented in response to execution of another one of the first thread or second thread, wherein the fairness counter is to be incremented or decremented in response to an execution event corresponding to the first thread or second thread, the event comprising: processor cycles, weighted processor cycles, or weighted instruction counts;

identifying a next thread for execution based on the determined fairness and an execution information signal that indicates information about currently executing threads;
causing generation of a next thread signal to cause a processor to execute the next thread; and
determining forward progress of a plurality of executing threads based on values stored in respective forward progress counters and a switch stimulus type from a plurality of switch stimulus types, wherein a value of a forward progress counter is to indicate whether to permit a voluntary switching out of a corresponding thread, and wherein the first thread and the second thread are distinct.

18. The method of claim 17, comprising:
determining fairness of execution of the first thread relative to execution of a third thread;
wherein the identifying includes identifying the next thread for execution based on the determined fairness of execution of the first thread relative to execution of the second thread and based on the determined fairness of execution of the first thread relative to execution of the third thread.

19. The method of claim 17, wherein determining fairness includes modifying content of the fairness counter in response to a first thread event and in response to a second thread event.

20. The method of claim 17, wherein determining fairness includes determining an unfair bias to the first thread if content of the fairness counter exceeds a threshold.

21. The method of claim 17, wherein determining fairness includes limiting modification of content of the fairness counter in response to a first thread event.

22. The method of claim 17, comprising:
determining forward progress of an executing thread; and
switching execution to the next thread in response to the determined forward progress.

23. The method of claim 22, wherein determining forward progress includes modifying content of a forward progress counter in response to an executing thread event.

24. The method of claim 22, wherein switching execution to the next thread includes switching execution to the next thread in response to content of the forward progress counter exceeding a threshold.

25. The method of claim 17, wherein the event further comprises an instruction count or any other repetitive event corresponding to execution.

26. A non-transitory computer readable media containing a program executable by a machine to perform operations that result in:
determining fairness of execution of a first thread relative to execution of a second thread based on a single value stored in a fairness counter, wherein the fairness counter is to be incremented in response to execution of one of the first thread or second thread and is to be decremented in response to execution of another one of the first thread or second thread, wherein the fairness counter is to be incremented or decremented in response to an execution event corresponding to the first thread or second thread, the event comprising: processor cycles, weighted processor cycles, or weighted instruction counts;
identifying a next thread for execution based on the determined fairness and an execution information signal that indicates information about currently executing threads;
causing generation of a next thread signal to cause a processor to execute the next thread; and
determining forward progress of a plurality of executing threads based on values stored in respective forward progress counters and a switch stimulus type from a plurality of switch stimulus types, wherein a value of a forward progress counter is to indicate whether to permit a voluntary switching out of a corresponding thread, and wherein the first thread and the second thread are distinct.

27. The non-transitory computer readable media of claim 26, wherein the program is executable by a machine to perform operations that result in:
  determining fairness of execution of the first thread relative to execution of a third thread;
  wherein the identifying includes identifying the next thread for execution based on the determined fairness of execution of the first thread relative to execution of the second thread and based on the determined fairness of execution of the first thread relative to execution of the third thread.

28. The non-transitory computer readable media of claim 26, wherein determining fairness includes modifying content of the fairness counter in response to a first thread event and in response to a second thread event.

29. The non-transitory computer readable media of claim 26, wherein determining fairness includes determining an unfair bias to the first thread if content of the fairness counter exceeds a threshold.

30. The non-transitory computer readable media of claim 26, wherein determining fairness includes limiting modification of content of the fairness counter in response to a first thread event.

31. The non-transitory computer readable media of claim 26, wherein the program is executable by a machine to perform operations that result in:
  determining forward progress of an executing thread; and
  switching execution to the next thread in response to the determined forward progress.

32. The non-transitory computer readable media of claim 31, wherein determining forward progress includes modifying content of the forward progress counter in response to an executing thread event.

33. The non-transitory computer readable media of claim 31, wherein switching execution to the next thread includes switching execution to the next thread in response to content of the forward progress counter exceeding a threshold.

34. The medium of claim 26, wherein the event further comprises an instruction count or any other repetitive event corresponding to execution.

35. A system comprising:
  a processor including logic to determine fairness of execution of a first thread relative to execution of a second thread based on a single value stored in a fairness counter, wherein the fairness counter is to be incremented in response to execution of one of the first thread or second thread and is to be decremented in response to execution of another one of the first thread or second thread, and logic to identify a next thread for execution based on the determined fairness and an execution information signal that indicates information about currently executing threads, wherein the logic circuitry to identify the next thread is to cause generation of a next thread signal to cause the processor to execute the next thread, wherein the fairness counter is to be incremented or decremented in response to an execution event corresponding to the first thread or second thread, the event comprising: processor cycles, weighted processor cycles, or weighted instruction counts;
  a fixed disk; and
  logic to determine forward progress of a plurality of executing threads based on values stored in respective forward progress counters and a switch stimulus type from a plurality of switch stimulus types, wherein a value of a forward progress counter is to indicate whether to permit a voluntary switching out of a corresponding thread, and wherein the first thread and the second thread are distinct.

36. The system of claim 35, wherein the logic to determine fairness is to determine fairness of execution of the first thread relative to execution of a third thread; and
  wherein the logic to identify the next thread for execution is to identify the next thread for execution based on the determined fairness of execution of the first thread relative to execution of the second thread and based on the determined fairness of execution of the first thread relative to execution of the third thread.

37. The system of claim 35, wherein the logic to determine fairness includes the fairness counter.

38. The system of claim 35, wherein the processor includes logic to determine forward progress of an executing thread and logic to switch execution to the next thread in response to the determined forward progress.

39. The system of claim 38, wherein the logic to determine forward progress includes the forward progress counter.

40. The system of claim 35, wherein the event further comprises an instruction count or any other repetitive event corresponding to execution.

* * * * *